United States Patent Office 3,473,022
Patented Oct. 14, 1969

3,473,022
DEVICE FOR DETERMINING THE PHOTOSYNTHETIC CAPACITY AND THE TRANSPIRATION RATE OF PLANTS
Heinz Walz, Erlangen, and Werner Koch, Grafrath, Germany, assignors to Siemens Aktiengesellschaft, a corporation of Germany
Filed Feb. 23, 1967, Ser. No. 618,005
Claims priority, application Germany, Feb. 24, 1966, S 102,194
Int. Cl. G01n 23/12
U.S. Cl. 250—43.5        21 Claims

ABSTRACT OF THE DISCLOSURE

Device for determining the photosynthetic capacity and the transpiration rate of plants by measuring the $CO_2$ content and the moisture of gases with the aid of ultra-red absorption devices, which comprises the combination of the following features:

(a) A Peltier-cooled moisture separator (1) is gas-conductively connected with a Peltier-cooled gas changing chamber (2) which serves to receive plants or live plant sections.

(b) A portion of the wall of the gas changing chamber is light permeable.

(c) At least one regulator (6, 7) is provided with which the physical conditions in the gas changing chamber, preferably temperature and moisture, are variable without delay.

(d) The gas changing chamber is gas-conductively connected with a first ultra-red absorption device (3) wherein the gas moisture is determined.

(e) The ultra-red absorption device is gas-conductively connected with a second Peltier-cooled moisture separator (4) and the latter is connected with a second ultra-red absorption device (5), wherein the $CO_2$ is determined.

---

The present invention relates to a device for determining the photosynthetic capacity and the transpiration rate of plants by measuring the $CO_2$ content and the moisture of gases by ultra-red absorption devices.

Carbon-trophic organisms synthesize glucose from carbon dioxide and water, under an energy supply. The $CO_2$ is taken in gaseous form from the atmosphere. Oxygen is freed during synthesis and released to the atmosphere. The energy source, as a rule, is sunshine. This process is called photosynthesis.

A quantitative examination of the photosynthesis is best conducted by gas analysis. The oxygen precipitation and the $CO_2$ absorption into the organism may be determined in a time unit. The known measuring methods offer a greater absolute measuring exactness during the determination of the $CO_2$ absorption. In order to measure the $CO_2$ absorption, air is supplied to the organism and after the exchange of gas, said air is supplied to an ultra-red absorption device, in order to determine the $CO_2$ content. The $CO_2$ absorption of the organism in the time unit is taken as a measure of its photosynthetic capacity. Conclusions may be drawn from the measured photosynthetic capacity, regarding the formation of glucose and the energy transformation in the organism.

The photosynthetic capacity of an organism depends on the following physical conditions:
Intensity and wavelength of the light beamed in,
Temperature,
$CO_2$ concentration in the air,
Water condition of the plant which, among other things, depends on the water vapor content in the air,
Width of the gap opening in the epidermis, as the short-term, variable biological factor.

The values must be kept constant for exact measuring results. On the other hand, it would be important to be able to simulate any desired conditions for the organism and thereby to examine its photosynthetic capacity. These measurements may be necessary for theoretical tests as well as for practical purposes. For example, the growth and harvest of a plant depend on the photosynthetic capacity of the plant. A device for determining the photosynthetic capacity may therefore be used as a testing apparatus for plants.

Similar conclusions to those derived from photosynthesis may also be drawn from transpiration. The transpiration rate of plants depends on the water vapor pressure in the atmosphere, the temperature and the movement of the air, as the most important outside factors, and on the width of the gap opening as the biological factor, regulated by the plant. For measuring the transpiration capacity under various conditions, which may also be carried out with an ultra-red absorption device, these values must also be varied within the known limits or they may be kept constant.

Since, from an ecological point of view, an evaluation of the photosynthetic capacity requires a consideration of the water consumption and since both processes depend on the same factors, the simultaneous measuring of the photosynthetic capacity and the transpiration rate is the goal of the present invention.

It is known to effect such measurements with the aid of the following device: plants are enclosed in a light-permeable gas changing chamber. From this chamber, an air current is supplied to a first ultra-red absorption device for determining the water vapor. Following the water vapor determination, the air current is dried by a drying means and the $CO_2$ evaluation is thereafter carried out in a second ultra-red absorption device. The results of the $CO_2$ evaluation would be erroneous without the drying process. Said $CO_2$ determination may be effected with excellent results in ultra-red absorption devices only when the water vapor content is slight and constant, as the absorption bands of $CO_2$ and water partially overlap. The use of conventional drying means has to date not been fully satisfactory. The large surface which acts more or less absorptive may effect considerable delays in the indication process which in short-term concentration fluctuations leads to an obscuring of the true course of the curve. Fluctuating temperatures also influence the adsorption balance of the $CO_2$, relative to the drying means, which may then lead to a faulty reading.

Furthermore, measurements effected with the described device are not easily made to relate to the respective natural habitat. Since the heat radiation of the plant no longer dissipates in the gas changing chamber and, also, since the humidity changes through transpiration, a "chamber climate" develops in the gas changing chamber, which no longer corresponds to the conditions of the habitat. Thus, for example, a temperature difference up to 15° is possible between the chamber and the natural habitat.

As a remedy, it had been suggested to replace the gas changing chamber with a suction plate upon which the living plant portions would be placed. This device, however, can only be used to carry out relative measuring processes.

According to another suggestion, the gas changing chamber should be operable upon hinges so as to be collapsible. It would be closed for a short period only for measuring purposes, so that a special, individual chamber climate, which differs markedly from the climate of the habitat, could not occur. It is not possible to simulate conditions suitable for the plants either in this chamber or with the suction plate.

It is also known how to regulate the climate of the chamber. Water cooling, cooling by means of a compressor aggregate or Peltier cooling is used to influence the temperature in the gas changing chamber. In this device, an adequately exact temperature regulation is effected only through cooling by means of a compressor, or by means of a Peltier aggregate. For measuring out in the open air, the only suitable device is the Peltier-cooled gas changing chamber, since only this device can be made appropriately portable.

To regulate the moisture in the chamber, drying apparatus were used exclusively up to now. The entire measuring air may be passed through the drying apparatus, prior to its flowing into the gas changing chamber. This results in a chamber moisture which strongly deviates from the moisture of the natural habitat. Regulating systems have also been used. In these systems, the measuring gas, prior to its flowing into the chamber, is either passed through the drying means until such time as the desired chamber moisture is reached, or else part of the air is suctioned off from the chamber into a partial cycle, dried therein and again passed to the chamber, until the desired chamber moisture is obtained. However, due to the aforementioned disadvantages associated with the drying means, the moisture regulation is very sluggish and inexact. Furthermore, substituting for the consumed drying means bring about an interruption of the measuring process.

Thus, the following task may be formulated in summary, if a biologically pertinent measuring of the photosynthetic capacities and a simultaneous determination of the transpiration rate are intended. In a gas changing chamber, the natural habitat climate is either to be reproduced exactly or any desired climate to be simultated for a plant. This requires a variation of the physical conditions within the chamber, especially those of temperature and moisture, within the largest possible range. The regulating system used hereby should work, if possible, without interruption. The moisture content as well as the $CO_2$ content in the measuring gas, led out from the chamber, should be determinable with the aid of the ultra-red absorption technique, independently from each other. Furthermore, the device should be applicable on the outside, for example on trees, as well as inside the laboratory.

According to the invention, we solve the above problem by a combination of the following features:

(a) A Peltier-cooled moisture extracting device is gas-conductively connected with a Peltier-cooled gas changing chamber, serving for receiving plants or live plant sections;

(b) A portion of the wall of the gas changing chamber is permeable to light;

(c) At least one regulating device is provided, by means of which the physical conditions in the gas changing chamber, preferably the temperature and moisture, may be varied without delay;

(d) The gas changing chamber is gas-conductively connected with a first ultra-red absorption device wherein the gas moisture is determined;

(e) Said ultra-red absorption device is gas-conductively connected with a second Peltier-cooled moisture separator and the latter with a second ultra-red absorption device wherein the $CO_2$ content is determined.

The temperature influence upon the individual devices is effected by Peltier blocks. A Peltier block combines many thermoelements in such a way that their respective cold and warm solder points are positioned in one plane, namely in the cold or warm side of the Peltier block. Preferably, the gas changing chamber is so designed that a Peltier block is connected, thermally conductive and electrically insulated, with ventilated cooling vanes (blower) and, at its cold side, with a portion of the wall of the gas changing chamber. The transparent portion of the wall is developed as a removable or collapsibly hinged, tightly sealing cover. Two gas pipes open into the gas changing chamber and its wall contains inlet openings, sealable with putty, for live plant sections. Frames, which are covered by threads, may be inserted into the gas changing chamber at various distances from each other. The inside of the gas changing chamber has a blower impeller, and the produced gas current is passed through deflector strips along the wall connected to the Peltier block. The blower impeller may be driven by an alternating motor, without a collector or collecting ring, located inside the gas changing chamber. In this arrangement, the number of rotations driving the ventilator impeller (blower) may not be changed. To change this speed, the ventilator impeller may be driven by a DC motor, via a magnetic coupling, said motor lying outside the gas changing chamber. A sealable opening is provided in the wall of the gas changing chamber for inserting a wind measuring device. A photocell for measuring the light intensity and a porometer for determining the width of the gap opening may be provided in the gas changing chamber. Furthermore, the gas changing chamber contains a regulating device for controlling the temperature in the gas changing chamber, by means of a radiation-protected temperature sensor. The temperature sensor may be covered with optical filters by a device located at the light-permeable cover of the gas changing chamber. The cooling vanes at the warm side of the Peltier block may be equipped with cooling water pipes and the wall portion of the gas changing chamber which is connected with the Peltier block may be equipped with cooling fins (ribs) which extend inside the gas changing chamber. The cooling water pipes are connected with a Peltier-cooled brine cooler device.

To cool the measuring gas to a specific melting point, a moisture separator is preferably used wherein a Peltier block is connected, thermally conductive and electrically insulating, with ventilated cooling vanes at its warm side and with a flow cooler at its cold side. The flow-through cooler has at least one flow path which runs in a zigzag fashion and is so guided that the gas is countercurrently twice led across the Peltier block. A container, collecting the liquid with a tapping screw, is provided at the lowest point along the flow path. The melting point of the gas in the moisture separator may be controlled by means of a regulator which is connected with a temperature sensor in each flow path. Also, the temperature regulating system of the first moisture separator may be controlled in proportion to the moisture intended for the gas changing chamber. A moisture sensor arranged in the gas changing chamber as an actual value indicator serves for this purpose.

The moisture sensor in the gas changing chamber may be an LiCl measuring sensor. If the dew point of the first Peltier-cooled moisture separator is adjustable up to an error of no more than $\pm 0.5°$ C., then the gas changing chamber may be directly gas-conductively connected with the second Peltier-cooled moisture separator, omitting the first ultra-red absorption device. Two resistance thermometers may be arranged in the LiCl measuring sensor. One of these resistance thermometers is used as an actual value indicator for the regulator, the second may be connected with an indicating device, for example a recorder, which registers the moisture value in the gas changing chamber.

It may be of advantage in the measuring process, to effect the changing of gas several times with the same measuring gas and to determine the same. It was therefore arranged to connect the last ultra-red absorption device with the first moisture separator; into a closed circulation for the measuring gas. In order to avoid changes in the dew point and, thereby, in the moisture of the measuring gas, during transport through the gas pipes which connect the individual units of the device, these pipes may be heated. The moisture separators and the gas changing chamber are so small and so easily built that they may be used in each habitat including out of doors. In order to fully utilize the ultra-red absorption devices, a gas reverser has been provided in front of the ultra-red absorption device wherein the measuring of the water vapor is carried out or, if the latter device is eliminated, said gas reverser is placed before the second Peltier-cooled moisture separator. This gas converter may supply the ultra-red absorption devices with measuring gas from various gas changing chambers.

The above-described device meets the demands imposed upon it. It makes possible an exact and errorless measuring of the photosynthetic capacity and of the transpiration rate of plants by determining the water vapor content and the $CO_3$ content of gases. In the second moisture separator, the measuring gas is dried until it contains a slight and constant moisture. The measuring of the $CO_2$ content may be carried out in the second ultra-red absorption device, the result not being impaired by an overlapping of the $CO_2$ bands with the water vapor bands. The chamber climate may be varied as desired with the provided regulating devices. Thus, the climatic conditions for plants may be varied to a large extent in the chamber or the chamber climate may be fashioned after the climate of the natural habitat.

A special process may be applied whereby, if the moisture of the gas which is supplied to the first moisture separator is to be so adjusted that it corresponds to the humidity of the natural habitat, the humidity of the gas in the chamber is higher than the habitat humidity since the former is also changed by the transpiration of the plants. Therefore, the dew point of the first moisture separator is so adjusted that, in the chamber, the moisture of the supplied gas plus the moisture produced through the plant transpiration produce the habitat humidity.

Some other advantages are to be emphasized which result from the particular construction of the gas changing chamber and of the moisture separators.

With the aid of the ventilator and of the sheet-metal guide for the gas current, a temperature gradient is prevented from occurring in the gas changing chamber. The chamber is tightly sealed so that a change in the measuring gas can result only from the gas exchange with the plant. For this reason, an AC motor, without a collector and a collecting ring, was inserted into the gas changing chamber. The warm side of the Peltier block of the gas changing chamber may be separately dried by means of the brine cooler apparatus. Thereby, it is possible to maintain temperatures in the gas changing chamber ranging from below 0 down to $-10°$ C. and, on the other hand, the gas changing chamber may be heated by reversing the current in the Peltier block. Temperatures up to $+50°$ C. may be realized in the gas changing chamber.

The moisture separator has long flow paths wherein the entire passing gas is cooled to the desired dew point. Since for drying purposes, dew points must be obtained which are below zero and since this entails the danger of freezing the flow paths, several isomorphous flow paths have been provided in the flow-through cooler. The current paths are reversible. This prevents an interruption of the measuring process in case a current path freezes.

The great exactness with which the temperature and thereby the dewpoint of the measuring gas can be adjusted in the moisture separator is particularly emphasized. The temperature may be kept constant within $\pm 0.5°$ C. for longer periods and even within $\pm 0.05°$ C. for short periods. This great temperature constancy results in an exact moisture adjustment of the measuring gas in the first Peltier-cooled moisture separator. Furthermore, by using an LiCl measuring sensor, the transpiration rate may be measured directly if the first Peltier-cooled moisture separator is calibrated. The first ultra-red absorption apparatus which is intended to determine the water vapor may then be omitted. To this end the dew point of the measuring gas and thereby also the moisture in the first Peltier-cooled moisture separator, are adjusted very exactly. The measuring gas is supplied to the gas changing chamber which is also temperature constant. The moisture of the gas can therefore change due to plant transpiration. If the moisture in the gas changing chamber is determined by means of the LiCl measuring sensor, then the value of the transpiration rate constitutes the difference between the moisture value in the gas changing chamber and the moisture value adjusted in the moisture separator. It is preferred to use an LiCl measuring sensor with two resistance thermometers for this purpose. The moisture value may then be directly recorded as the measuring value of the one resistance thermometer, while the measuring value of the second resistance thermometer represents the actual value in the control circuit for the dew point adjustment in the first Peltier-cooled moisture separator.

The control circuits which may influence the temperature and the moisture in the gas changing chamber may also be controlled at a nominal value by means of a program. This offers the advantage that plants may be subjected, during a series of tests, to specific conditions in an exact, temporal sequence. It should be pointed out in this respect that this program control is free of delays, due to the temperature adjustment via the Peltier blocks.

The device according to the invention will now be disclosed in greater detail on hand of FIGS. 1 to 11. The temperature constant in the gas changing chamber obtained in the case of the specific examples amounts to at least $\pm 0.5°$ C. for several days. At an outside temperature of $25°$ C., the temperature control range lies between $+15°$ C. and $+50°$ C. With the aid of the brine cooler apparatus, the temperature range can be extended to below 0. In the moisture separators, the dew point may be set exactly at $0.25°$ C. This results in an exact control of the desired humidity of $\pm 2\%$.

Figure 5:
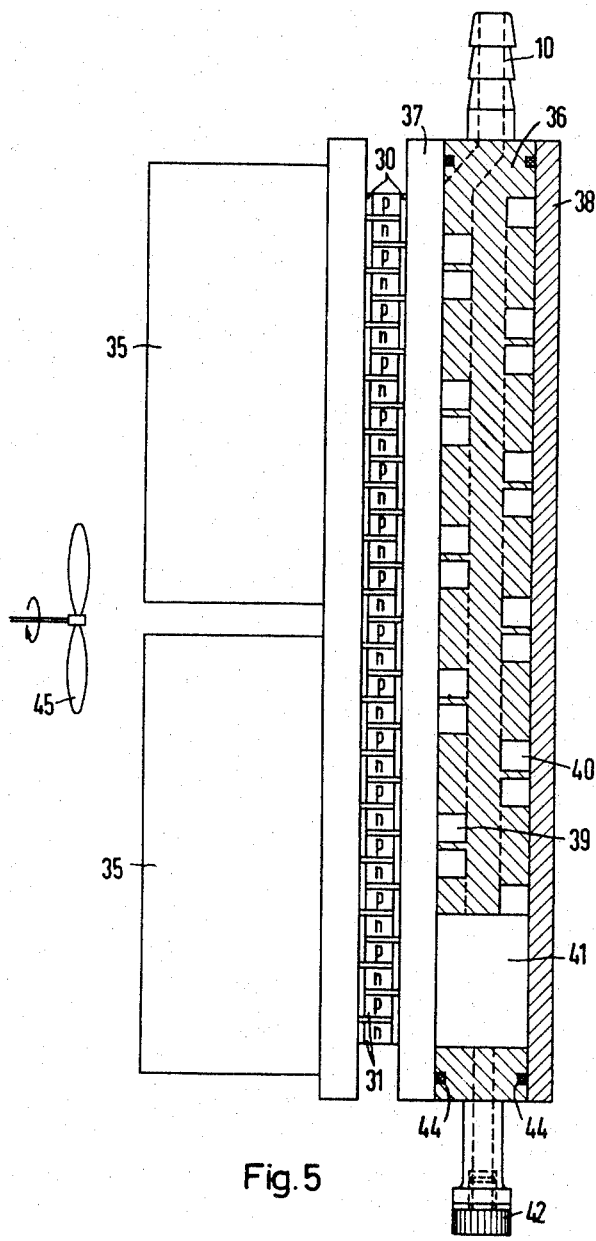
Figure 6:
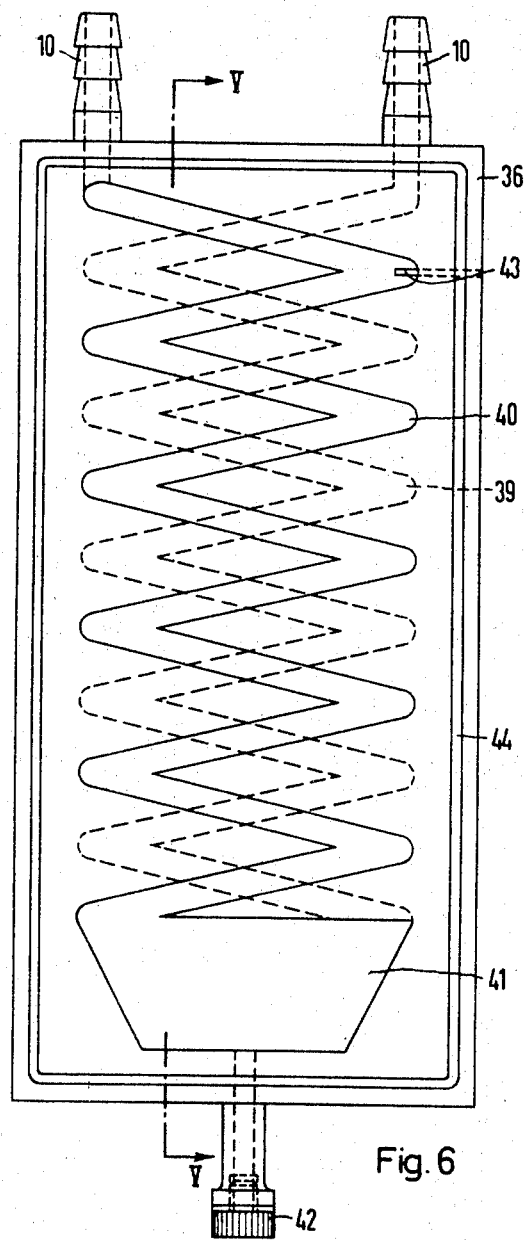

FIGS. 5 and 6 show the details of the moisture separator. FIG. 6 shows a plan view of the moisture separator, with cover removed; FIG. 5 shows a section through the moisture separator along line V—V of FIG. 6.

Figure 1:
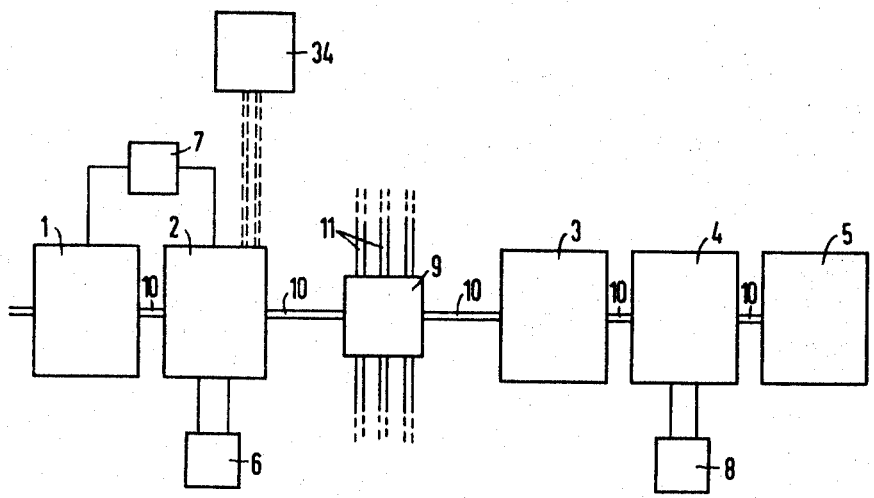
FIG. 1 shows the over-all arrangement of our apparatus.
Figure 7:
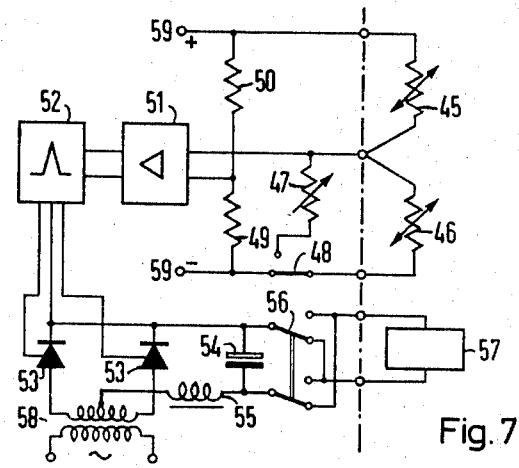
Figure 10:
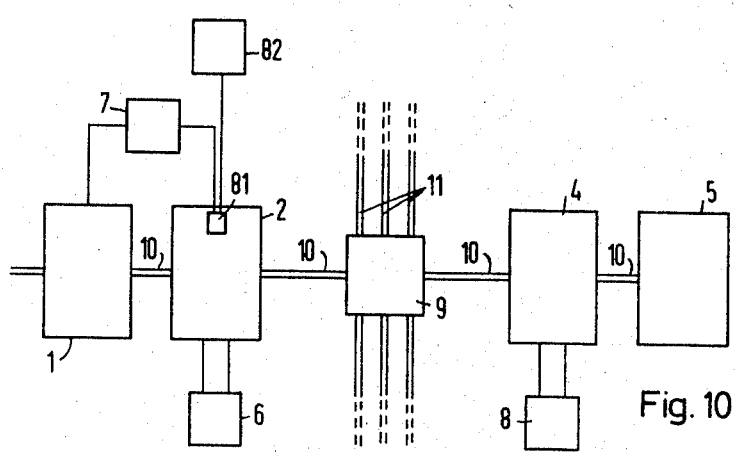
Figure 8:
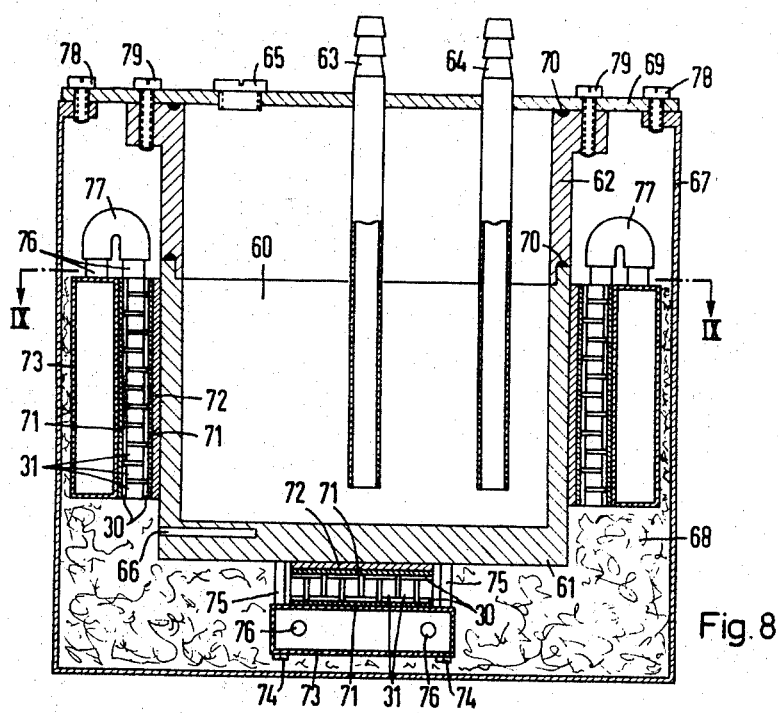
Figure 9:
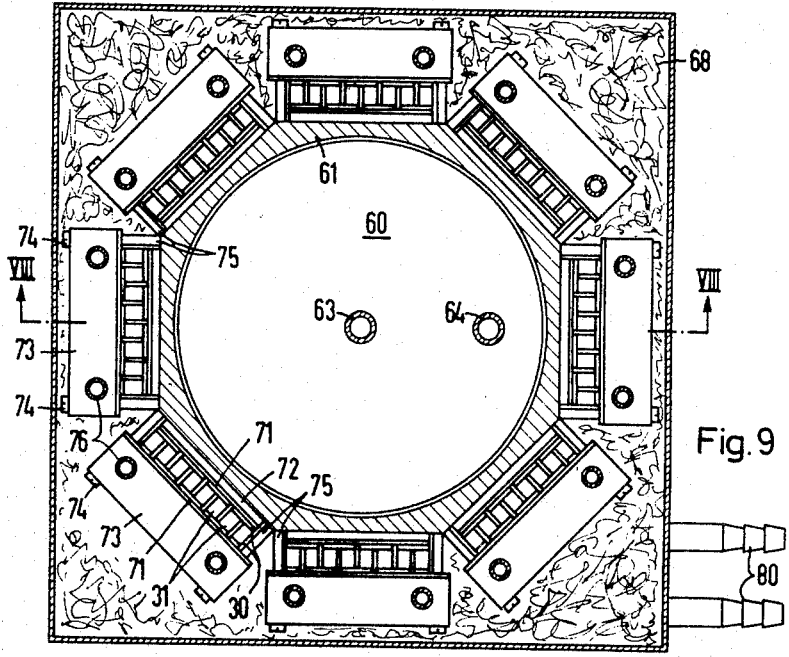

FIG. 7 shows a primary circuit design of the proportion regulators 6, 7 and 8;

FIGS. 8 and 9 show the details of the brine cooler apparatus. FIG. 9 shows a section along line IX—IX of FIG. 8 which in turn shows a section of the brine cooler apparatus along line VIII—VIII of FIG. 9;

FIG. 10 shows an alternate arrangement to FIG. 1 and

Figure 11:
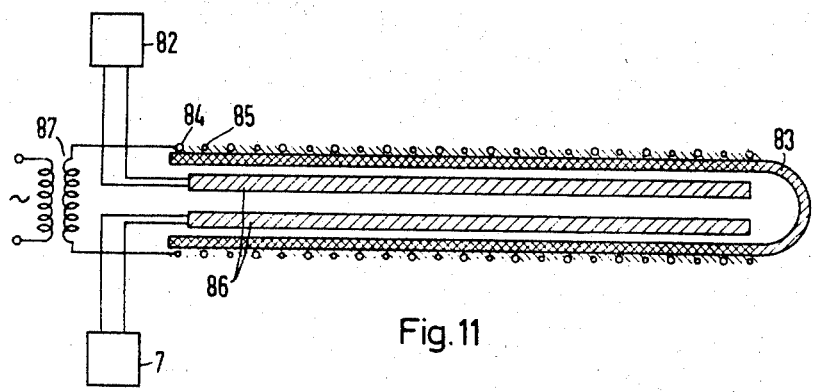

FIG. 11 shows in section the basic construction of an LiCl measuring sensor.

FIG. 1 shows the over-all arrangement of the apparatus. The first moisture separator 1 is connected to the gas changing chamber 2 by a gas pipe 10. The temperature in the gas changing chamber may be controlled by regulator 6. The temperature curve in the gas changing chamber is observed by a temperature sensor, for example a resistance thermometer, acting as the actual value indicator. Any deviation from the nominal value, which may be a standard temperature, is picked up, without delay, by the regulator and is readjusted by changing the current intensity in the Peltier blocks. The moisture in the gas changing chamber is to be controlled by regulator 7. The actual value indicator is an exchangeable electric moisture sensor, for example an LiCl measuring sensor, which is installed into the gas changing chamber and which can perform either a relative or an absolute measuring process. The desired relative moisture may be adjusted to the nominal value indicator of the regulator. In order to shift the temperature control range in the gas changing chamber to below zero, the chamber may be pre-cooled by a brine cooling apparatus 34. The measuring gas is introduced into the first ultra-red absorption device 3, via gas converter 9, into which open other measuring gas pipes 11, where the water vapor content of the measuring gas in determined. For determining the $CO_2$ content, the measuring gas is introduced into the second ultra-red absorption device 5 via the second moisture separator 4, whose dew point is controlled by regulator 8. In the second moisture separator 4, the measuring gas is dried to contain only a slight and constant moisture, for the purpose of ensuring an errorless $CO_2$ determination. All pipes from one section to another are shown by 10.

Figure 4:
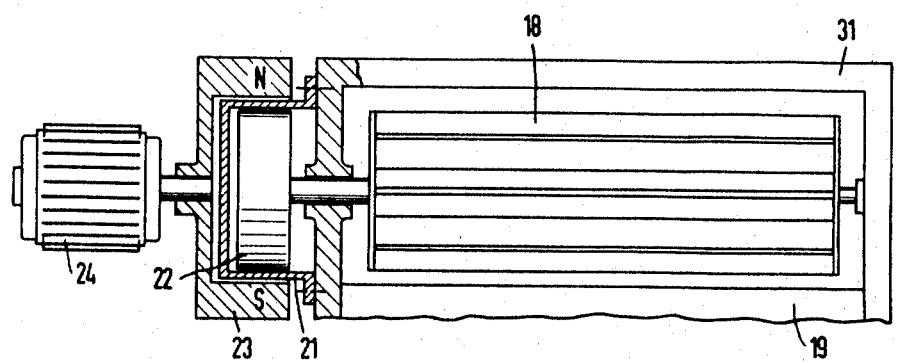
FIGS. 2, 3 and 4 show the details of the gas changing chamber.
Figure 2:
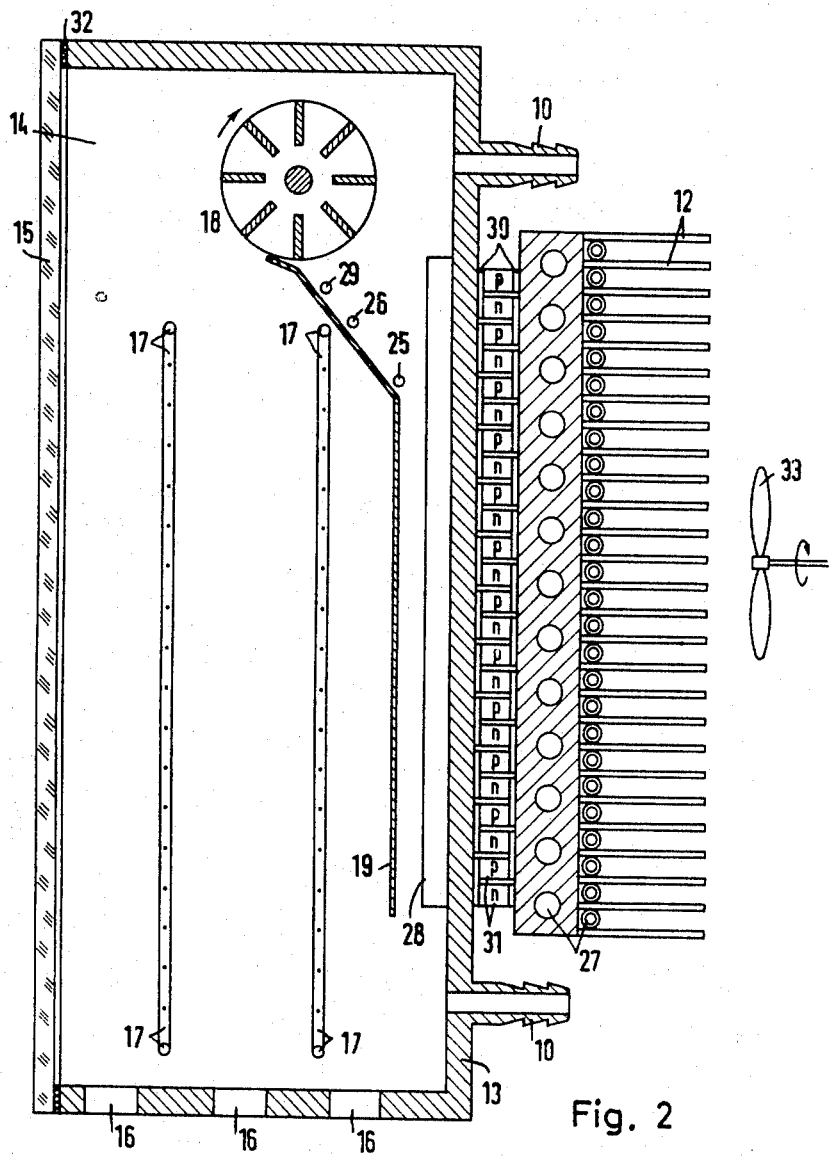
Figure 3:
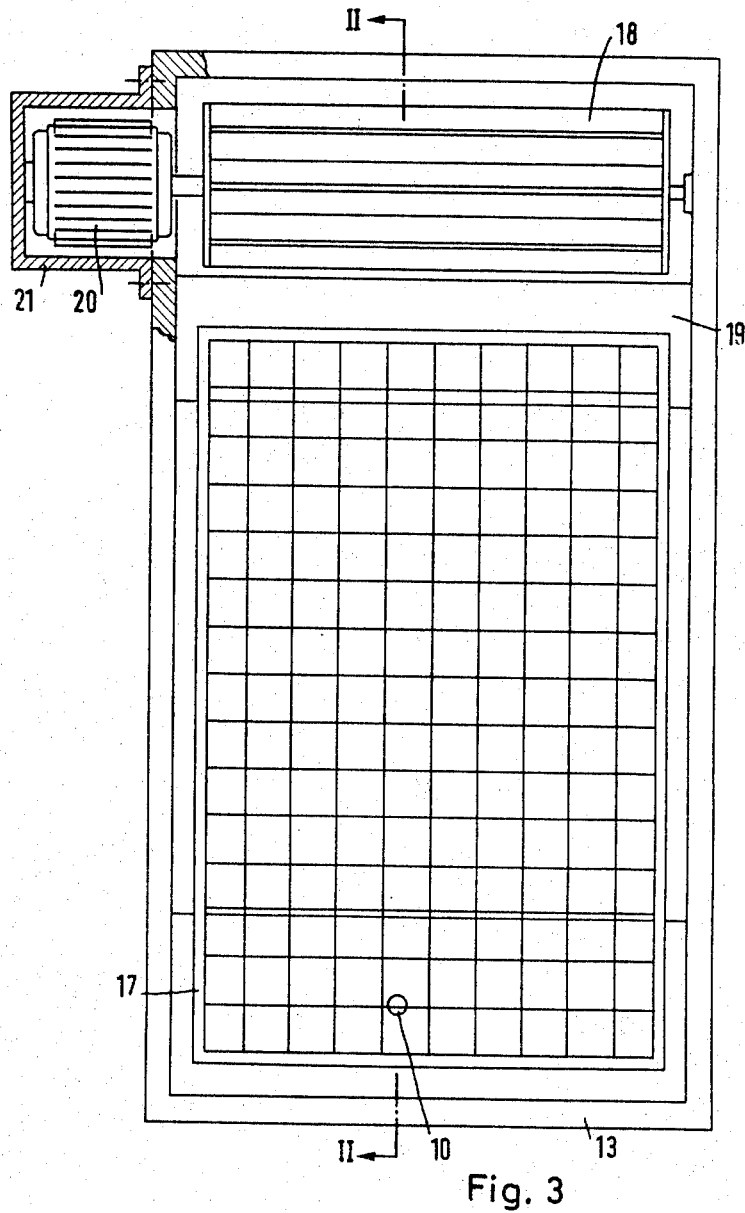

FIG. 2 is a section through the gas changing chamber in line II—II of FIG. 3. FIG. 3 shows a plan view of a gas changing chamber whose cover is removed and a section through the ventilator motor housing. FIG. 4 shows a partial view with a section through a magnet coupling between the ventilator or blower impeller and the DC motor, outside of the gas changing chamber.

FIG. 2 shows the Peltier block 30 whose n- and p-conducting semiconductor bodies 31 are connected through contact bridges, in an electrically conducting manner. One side of the Peltier block is connected with cooling vanes 12. Additional cooling pipes 27 are provided at said cooling vanes, the latter being cooled by a fan 33. When temperatures below the zero point are desired in the gas changing chamber, then salt water (brine) is pumped through the cooling pipes 27 of the cooling vanes 12. The salt water is precooled in the brine cooling apparatus 34 (FIG. 1). Thus, the warm side of the Peltier blocks is cooled separately. The second, cold side of the Peltier block is connected via a portion of the wall 13 to the gas changing chamber 14. Cooling vanes 28 extend inside into the gas changing chamber. The transparent cover 15 is removable or as seen in another embodiment hinged. The gas changing chamber may be hermetically sealed by a sealing ring 32. Through the openings 16 in the wall, live plant sections, for example branches or leaves, may be inserted inside the gas changing chamber. These openings 16 are closed with plastic, chemically neutral putty. The plant sections may be attached to the holding frames 17 which are covered with thread in the form of a net. Several holding lattices may be inserted into the gas changing chamber at various distances from each other. The blower 18, together with the deflector 19, provides for the air circulation in the gas changing chamber. The air current is so guided that it sweeps over the cooling vanes. The temperature sensor 26, for example a resistance thermometer, and the moisture sensor 29, for example an LiCl measuring sensor, are located, protected from light, behind the deflector 19. The air current velocity may be measured by the wind measuring device 25. The measuring gas is guided in and out of the gas changing chamber through the openings 10.

FIG. 3 shows a plan view of holding frame 17. In the motor housing 21, shown in section, an alternating current motor 20, without a collector or collecting ring, is positioned. The use of this motor in the gas changing chamber prevents the measuring gas from changing. However, there is the disadvantage that the number of rotations of the alternating current motor is not variable.

The blower, according to another embodiment, may be coupled to a variable-speed direct current motor which is located outside of the gas changing chamber. FIG. 4 shows such a magnet coupling 22, 23 by means of which a speed-variable DC motor 24 drives the ventilator or blower impeller. By this device, it becomes possible to continually vary the speed of the air current produced in the gas changing chamber.

FIGS. 5 and 6 show the details of the moisture separator. A section through the moisture separator along the line V—V of FIG. 6 is shown in FIG. 5. FIG. 6 shows a top view of the moisture separator, with removed cover.

In FIG. 5, the Peltier block 30 is again connected at one side to cooling vanes 35 which are cooled by the fan 45. A cooler for fluid is mounted onto the other side of the Peltier block. This cooler consists of base plate 37, a middle portion 36 and the cover 38. Flow path channels 39, 40 are cut into the two opposite facing lateral surfaces of the middle portion 36. The cooler is hermetically sealed by the sealing rings 44, between the base plate 37 and the middle portion 36 and between the cover 38 and the middle portion 36.

The top view of the flow-through chamber in FIG. 6 shows the zigzag-shaped course of the flow path. A portion 40 of the flow path proceeds at the upper side of the middle portion 36 toward the liquid collecting container 41 from whence it is returned along the lower side of the middle portion 36 in a second portion 39 of the flow path. This allows the flow path to be as long as possible and ensures that the gas is passed twice across the Peltier block, according to the countercurrent principle. Thus, the temperature of the gas corresponds as closely as possible to the adjusted dew point and the aforementioned exactness in the moisture control is thus obtained. The container 41, collecting the liquid, may be emptied by the drainage screw 42. Temperature sensor 43, for example a resistance thermometer, is provided in the flow path.

In the embodiment of the moisture separator disclosed in the drawing, only one flow path was provided in the flow cooler. It is preferable to mill at least a second flow path similarly flowing into the flow cooler. When the dew point in the moisture separator is below 0° C., there is danger that the flow path may be frozen. In this event, an interruption of the measuring process may ensue until the flow path melts again. A second flow path can prevent any interrupion.

In FIG. 7 resistors 45, 46, 47, 49 and 50 are combined into a bridge circuit. The regulator resistance 45 serves as the actual value indicator. In regulator 6, it comprises a resistance thermometer arranged in the gas changing chamber; in regulator 7, an electrical moisture sensor, for example an LiCl measuring sensor, also arranged in the gas changing chamber, and in regulator 8 it is again a resistance thermometer which is arranged as a temperature sensor in the flow path of the moisture separator 4. The regulating resistance 46 is the nominal value indicator. In regulator 6, this is a resistance thermometer, which shows the temperature of the natural habitat and in regulator 7 it is also a resistance thermometer which is arranged as a temperature sensor in the flow path of the moisture separator 1. In place of the regulating resistance 46, the potentiometer 47 may be connected into the bridge arm, by means of switch 48. With the aid of the potentiometer, any desired temperature and moisture values may be simulated with regulators 6 and 7. These values in the climate chamber are not dependent on the conditions of the natural habitat. With the aid of the potentiometer 47 a dew-point temperature is adjusted in regulator 8, to freeze out the entire moisture content of the measuring gas. The bridge is supplied with direct voltage by the terminals 59. The output voltage of the bridge controls the pulse generator 52 via a transistor amplifier 51. Generator 52 controls the two thyristors 53 of the current supply devices for the Peltier blocks. An alternating voltage is supplied to the thyristors, via transformer 58.

When the actual value deviates greatly from the nominal value, a relatively large voltage is received at the bridge output. This fully controls the transistor amplifier. Hence, the thyristors are opened during the entire halfwave by the pulse generator and direct current is passed via filter members 54, 55 to the schematically illustrated Peltier blocks 57. The bridge output voltage becomes relatively smaller when the deviations between the actual and the nominal value become smaller; the voltage of the transistor amplifier is also reduced so that the pulses of the generator are temporarily displaced which also temporarily shifts the firing time of the thyristors. Thus, the entire halfwave can no longer flow through the thyristor. This reduces the electrical capacity delivered to the Peltier blocks and in turn reduces the cooling capacity.

The current direction of the Peltier elements may be reversed with converter 56, so that heating or cooling may be effected selectively.

FIG. 8 shows a metallic vessel 61 with a cylindrical hollow chamber 60. The outer wall of the vessel 61 has planar surfaces. The Peltier blocks 30, 31 are connected by their cold side to the planar outer surfaces and to the bottom of the metallic vessel 61, via layer 71, comprising electrically insulating and thermally well conducting material, for example mica, via metal plate 72. Flow-through coolers 73 are mounted on the warm side of the Peltier blocks. Pipes 76 end into said flow coolers, said pipes 76 being so connected between the individual Peltier blocks, by hose connections 77, that a continuous flow path is formed for the cooling water for the warm side, wherein all the Peltier blocks are connected in series. The Peltier blocks are attached to the metal vessel 61, by means of screws 74. Between the flow-through coolers 73 and the screws 74 lie synthetic sleeves 75, provided to reduce the thermal shunt.

A synthetic ring 62, mounted on the inside cooling container 61, is attached by screws 79 to cover 69. Sealing rings 70 are provided between the cooling vessel 61 and the synthetic material ring 62 and between the cover 69 and the synthetic ring 62. The latter reduces the heat conduction from the cooling apparatus to the outer housing 67 whereon the cover has been mounted by means of screws 78, for the purpose of thermal insulation. The intermediate space between the cooling apparatus 61 and the outer housing 67 is filled in with flakes of synthetic material, which may for example be constituted of Styropor (foamed polystyrene).

Two pile lines 63 and 64 lead through the cover 69. The brine flows into the cooling chamber via pipe 63. The pipe line 64 is connected with a suction pump which draws off the cooled brine which is then supplied to the cooling pipes 27 in the heat exchanger of the gas changing chamber 2.

A contact thermometer may be inserted, through opening 65 in the cover 69, into the inside of the brine cooler apparatus. The desired temperature of the brine may thus be adjusted, via an appropriate control device, according to FIG. 7. A resistance thermometer was provided for a more accurate control and may be inserted into the duct 66 in the bottom of the metallic cooling vessel 61. Thermometer 66 gives the actual value for the regulator. The Peltier blocks which are electrically in series are then controlled via the current supply of the regulating device.

In FIG. 9, we see a plan view of the metallic cooling vessel 61. The cooling vessel possesses eight planar outer surfaces upon which the Peltier blocks are mounted. Two hose connecting nipples 80 are arranged at the outside housing 67. These nipples supply the cooling water to the warm side of the Peltier blocks.

The arrangement of FIG. 10 differs from that of FIG. 1 by the omission of the first ultra-red absorption vessel 3. This omission is made possible by the arrangement of an LiCl measuring sensor 81 which serves as a moisture sensor in the gas changing chamber 2. A moisture separator is provided as the first moisture eliminator 1 and regulates the dew-point temperature of the measuring gas to at least ±0.5° C. within a calibrated moisture value. Thus the moisture of the measuring gas which is passed into the gas changing chamber is known from the adjusted dew point in the moisture separator 1. Two resistance thermometers are located in the LiCl measuring sensor 81 in the gas changing chamber 2. One resistance thermometer supplies the actual value for the afore-described regulating device 7. The moisture value which is measured by the second resistance thermometer is automatically recorded in device 82. As the temperature in the gas changing chamber is also kept constant through the regulator 6, a change of the moisture in the chamber may be effected only through plant transpiration. Thus, the transpiration rate of the plants is obtained as the difference between the moisture value adjusted in the moisture separator 1 and the moisture value which was recorded in the recording device 82.

The accuracy of the measuring method depends first of all on the exactness with which the dew point has been adjusted in the moisture separator. If a dew point adjustment may be obtained which is exact to at least ±0.5° C., then the accuracy corresponds almost exclusively to that obtained during the determination of the water vapor with the ultra-red absorption device. The advantage of this measuring device lies in the fact that it eliminates one of the expensive ultra-red absorption devices. Particularly favorable, however, is the use of the measuring method in the open since it circumvents the difficulties associated with calibration, which occur when the moisture is measured by means of an ultra-red absorption device.

In FIG. 11, two electrode coils 84 and 85 are wound around a sleeve 83 of a glass web which is saturated with lithium chloride. Inside the glass sleeve are two resistance thermometers 86, one of which is connected electrically conductively with the regulator 7 and the second with the recording device 82. Each of the two electrode coils 84 and 85 is connected with one of the two outputs of a transformer 87, which is energized from an alternating current source.

Lithium chloride, which is very hydroscopic, absorbs water from its vicinity and becomes electrically conductive. The flow of current between the electrode coils 84 and 85 heats the lithium chloride and vaporizes water until the transition point is reached at a specific temperature. At this point only solid salt is virtually present and therefore the electrical conductivity and the supplied heating capacity are strongly reduced. As the dry lithium chloride again absorbs water, an equilibrium condition will be obtained at a specific conversion temperature. The latter has a close relationship to the moisture content of the surroundings. This content may be very exactly established from the conversion temperature. The LiCl measuring sensors available on the market permit a measuring accuracy of ±1% of moisture.

It should be reemphasized that the aforedescribed device may not only be used for measuring the photosynthetic capacity. The device may also be employed in the testing of dissimilation processes wherein organic substances are dissociated in organisms through reduction processes controlled by fermentation and $CO_2$ is supplied to the atmosphere. The experiments must be conducted in the dark in order to eliminate the photosynthesis. The amount of dissimilation is obtained from the concentration of $CO_2$ in the measuring gas, by measuring it in the ultra-red absorption device.

It must further be added that the moisture separator is well suited, in combination with a temperature recorder, for the calibration of an ultra-red absorption device for measuring the water vapor. The calibration gas may be produced with a defined water vapor, with the aid of the regulator 8. Care should be taken that for short-term calibration measuring, the maintenance of the dew point is better than ±0.05° C. in connection with the aforedescribed moisture separator.

We claim:
1. Device for determining the photosynthetic capacity and the transpiration rate of plants by measuring the $CO_2$ content and the moisture of gases with the aid of ultra-red absorption devices, which comprises the following combination:
  (a) a Peltier-cooled moisture separator connected through a gas line to a Peltier-cooled gas changing chamber which serves to receive plants or five plant sections, (b) a light permeable portion of the wall of the gas changing chamber, (c) at least one regulator for varying without delay at least one of the temperature and humidity conditions in the gas changing chamber, (d) a gas line connected between the gas changing chamber and a first ultra-red absorption device wherein the gas moisture is determined, (e) said ulrta-red absorption device is gas-conductively connected with a second Peltier-cooled moisture separator which in turn is connected with a second ultra-red absorption device, wherein $CO_2$ is determined.

2. The gas changing chamber of claim 1, wherein a Peltier block is thermally conductingly and electrically insulatingly connected at its warm side with ventilated cooling vanes and connected at its cold side with a portion of the wall of the gas changing chamber, and the transparent part of the wall is a removable, tightly sealed cover.

3. The apparatus of claim 2, wherein two gas lines open into the gas changing chamber whose wall has openings for holding living plant portions.

4. Device for determining the photosynthetic capacity and the transpiration rate of plants by measuring the $CO_2$ content and the moisture of gases with the aid of ultra-red absorption devices, which comprises the following combination:

(a) a Peltier-cooled moisture separator connected through a gas line to a Peltier-cooled gas changing chamber, wherein a Peltier block is thermally conductingly and electrically insulatingly connected at its warm side with ventilated cooling vanes and connected at its cold side with a portion of the wall of the gas changing chamber, two gas lines opening into the gas changing chamber whose wall has openings for receiving plants or live plant sections, (b) a removable light permeable tightly sealed cover portion of the wall of the gas changing chamber, (c) at least one regulator for varying without delay at least one of the temperature and humidity conditions in the gas changing chamber, (d) a gas line connected between the gas changing chamber and a first ultra-red absorption device wherein the gas moisture is determined, (e) said ultra-red absorption device is gas-conductively connected with a second Peltier-cooled moisture separator which in turn is connected with a second ultra-red absorption device, wherein $CO_2$ is determined, and (f) frames covered with threads in the form of a net in the gas changing chamber at various distances from each other.

5. The apparatus of claim 4, wherein a ventilator impeller is provided inside the gas changing chamber and the produced gas current is passed by guides across the portion of the wall which is connected to the Peltier block.

6. The apparatus of claim 5, wherein the ventilator impeller is driven by an AC motor without a collector, said motor being positioned inside the gas changing chamber.

7. The apparatus of claim 5, wherein the ventilator impeller is driven by a DC motor via a magnetic coupling, said motor is located outside the gas changing chamber and is of variable speed.

8. The apparatus of claim 5, wherein the wall of the gas changing chamber is provided with a sealable opening for inserting an air meter.

9. The apparatus of claim 8, wherein the gas changing chamber contains a photocell for measuring the light intensity and a porometer for determining the width of the gas opening.

10. The apparatus of claim 9, containing a regulating device equipped with a radiation-protected temperature sensor for controlling the temperature in the gas changing chamber, and an optical filter to cover the light-permeable cover.

11. The apparatus of claim 10, wherein the cooling vanes at the warm side of the Peltier block are equipped with cooling water pipes and the portion of the wall of the gas changing chamber which is connected with the Peltier block is equipped with cooling fins which extend inside the gas changing chamber.

12. The apparatus of claim 11, wherein the cooling water pipes are connected with a Peltier-cooled brine cooler apparatus.

13. The apparatus of claim 1, containing a moisture separator comprising a Peltier block which is connected thermally conducting and electrically insulating with ventilated cooling vanes at its warm side, and with a flow-through cooler, which acts as a heat exchanger, at its cold side.

14. The apparatus of claim 13, containing at least one flow path in the flow cooler, said flow path proceeding in a zigzag shape and being so guided that the gas is countercurrently passed twice across the Peltier block.

15. Device for determining the photosynthetic capacity and the transpiration rate of plants by measuring the $CO_2$ content and the moisture of gases with the aid of ultra-red absorption devices, which comprises the following combination:

(a) a Peltier-cooled moisture separator connected through a gas line to a Peltier-cooled gas changing chamber, wherein a Peltier block is thermally conductingly and electrically insulatingly connected at its warm side with ventilated cooling vanes and connected at its cold side with a portion of the wall of the gas changing chamber, two gas lines opening into the gas changing chamber whose wall has openings for receiving plants or live plant sections, (b) a removable light permeable tightly sealed cover portion of the wall of the gas changing chamber, (c) at least one regulator for varying without delay at least one of the temperature and humidity conditions in the gas changing chamber, (d) a gas line connected between the gas changing chamber and a first ultra-red absorption device wherein the gas moisture is determined, (e) said ultra-red absorption device is gas-conductively connected with a second Peltier-cooled moisture separator which in turn is connected with a second ultra-red absorption device, wherein $CO_2$ is determined, and (f) at least one of said moisture separators comprising a Peltier block which is connected thermally conducting and electrically insulating with ventilated cooling vanes at its warm side, and with a flow-through cooler, which acts as a heat exchanger, at its cold side, at least one flow path in the flow-through cooler, said flow path proceeding in a zigzag shape and being so guided that the gas is countercurrently passed twice across the Peltier block, said moisture separator comprising a collecting vessel for the liquid equipped with a drain plug at the lowest point of the flow path.

16. The apparatus of claim 15, wherein a temperature regulator having temperature sensors is provided in each flow path.

17. The apparatus of claim 16, wherein the temperature of the first moisture separator is controlled by a regulating system in proportion to the moisture, which is specified for the gas changing chamber, and that the actual value indicator is an exchangeable moisture sensor which is arranged inside the gas changing chamber.

18. The apparatus of claim 17, wherein a LiCl moisture is within the gas changing chamber.

19. The apparatus of claim 18, wherein the dew point of the first Peltier-cooled moisture separator is adjustable to within $\pm 0.5°$ C., by omitting the first ultra-red absorption device, the gas changing chamber is directly, gas-conductively, connected with the second Peltier-cooled moisture separator and two resistance thermometers are arranged in the LiCl measuring sensor.

20. The apparatus of claim 19, wherein the ultra-red absorption device is connected with the first moisture separator to form a closed circuit for the measuring gas.

21. The apparatus of claim 20, containing gas throw-over switch means for selectively supplying the measuring gas from various gas changing chambers to the first ultra-red absorption device and to the second Peltier-cooled moisture separator.

References Cited
UNITED STATES PATENTS

| | | | |
|---|---|---|---|
| 3,014,129 | 12/1961 | Martin | 250—43.5 |
| 3,166,928 | 1/1965 | Jackson et al. | 62—3 |
| 3,195,344 | 7/1965 | Francisco | 62—3 |

RALPH G. NILSON, Primary Examiner

S. C. SHEAR, Assistant Examiner